Dec. 20, 1966  J. BAUDE  3,293,446
A.C. STANDBY POWER SUPPLY SYSTEMS
Filed May 13, 1963  4 Sheets-Sheet 1

United States Patent Office 3,293,446
Patented Dec. 20, 1966

3,293,446
A.C. STANDBY POWER SUPPLY SYSTEMS
John Baude, Milwaukee, Wis., assignor to Allis-Chalmers Manufacturing Company, Milwaukee, Wis.
Filed May 13, 1963, Ser. No. 282,529
11 Claims. (Cl. 307—66)

This invention relates to power inverter systems, particularly to inverter systems that are utilized as A.C. standby power supply systems to furnish alternating current power to a load in the event of failure of the normal supply.

In many applications using alternating current to supply a load, it is often necessary, or at least highly desirable, to provide means for supplying alternating current power if the normal power source fails. This need has led to the development of A.C. standby power supply systems that operate from an alternate source of power. A common alternate source of power is a battery because it is reliable and continuously available without requiring much maintenance or observation.

In utilizing a battery to furnish the alternate emergency power supply to an A.C. load, three basic system are available.

The first system operates a power inverter continuously from the battery to supply the load and uses a battery charger to maintain the charge level of the battery. In event of failure of the alternating current power supply the inverter keeps operating until the battery discharges to a point too low to supply the power requirements of the load.

The second system also operates a power inverter continuously but relies upon a rectifier for furnishing power to the inverter. A battery is used to furnish power upon failure of the alternating current power source.

The third system connects the alternating current supply directly to the load and has the battery and power inverter in a separate circuit. Additional circuitry is connected to the A.C. power supply to sense the power being furnished. In the event of failure of the A.C. power source it disconnects the normal A.C. power supply and connects the load to the inverter which then operates from the power furnished by the battery.

This invention utilizes the third general scheme and provides a system that is highly reliable and low in cost.

The objects of this invention are: to provide a new and improved A.C. standby power supply system; to provide an A.C. standby power supply system that is highly reliable and requires little maintenance; to provide a standby system that is flexible in design and application; to provide a standby system that does not use any significant portion of battery power unless the alternating current system fails; to provide a standby system that produces power with low harmonic distortion; to provide a standby system that provides power to a load instantaneously and automatically upon failure of the normal power supply; and to provide a standby system that is light in weight and relatively low in cost.

Advantages and other objects will appear from the detailed description of the invention.

Figure 2:
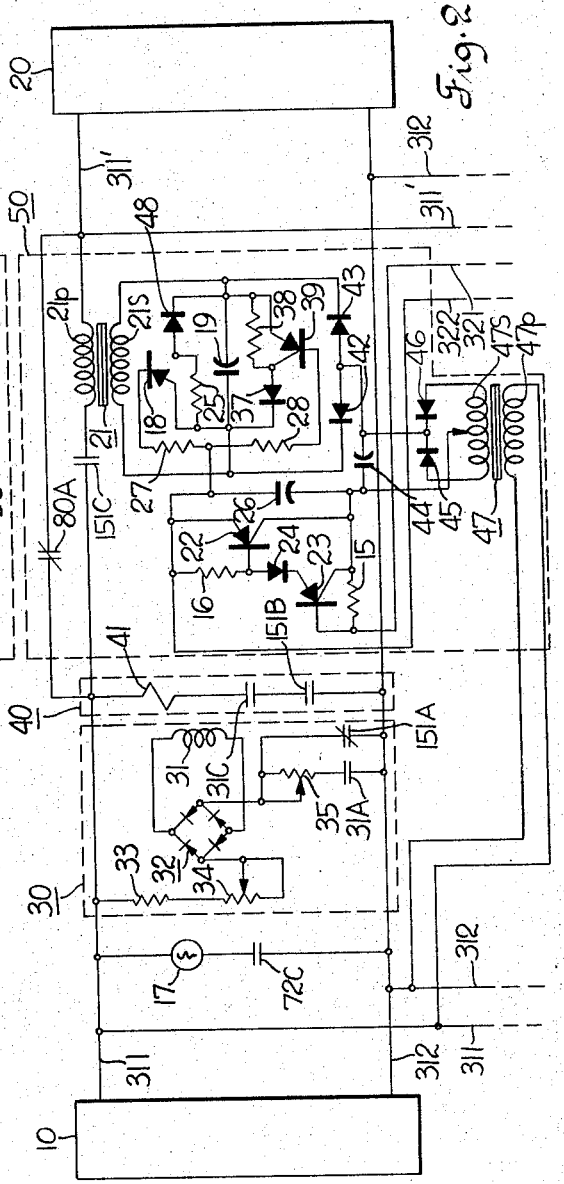
FIG. 2 is a schematic drawing of an embodiment of a portion of a circuit of this invention.
Figure 3:
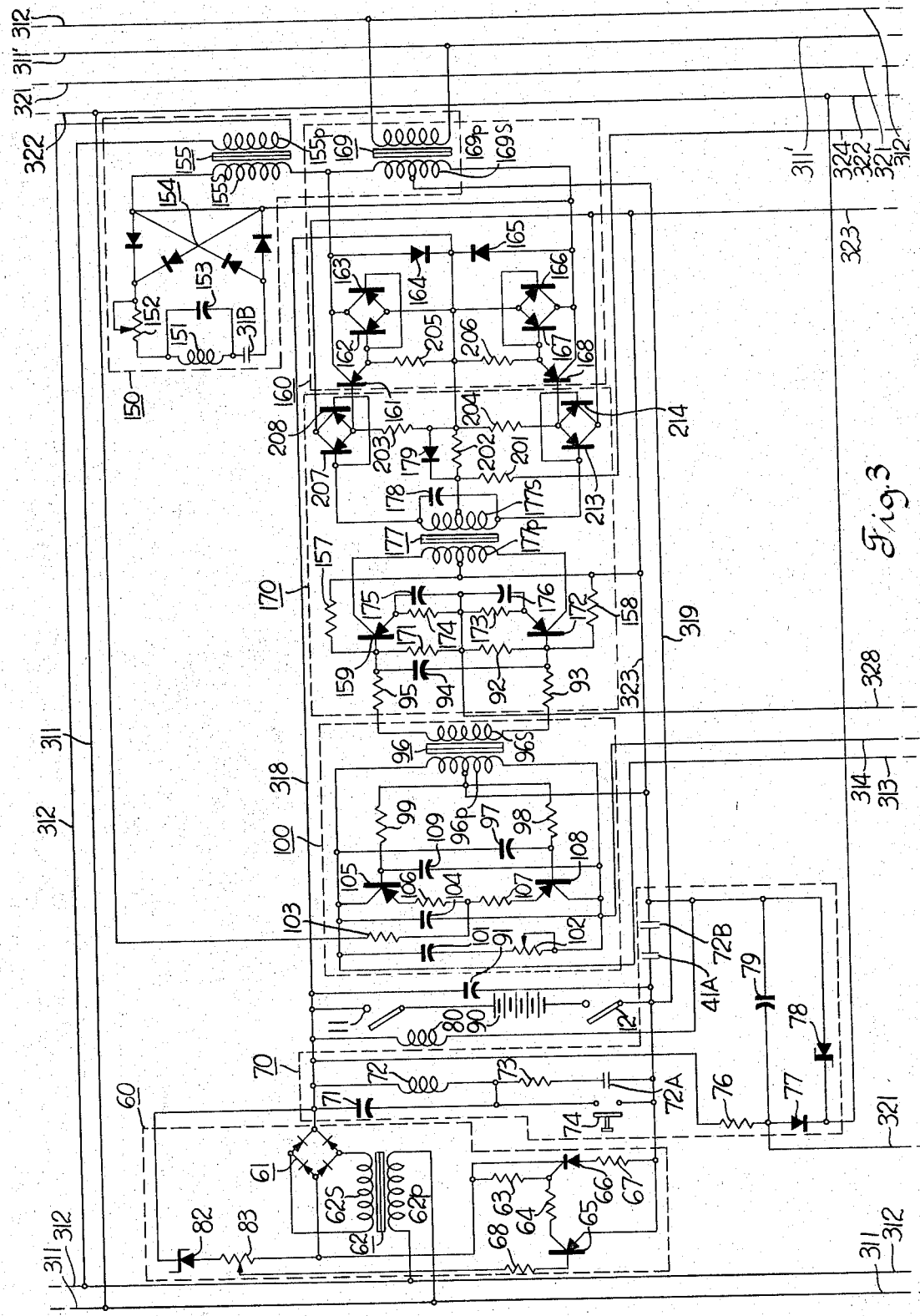
FIG. 3 is a schematic drawing of an embodiment of a portion of a circuit of this invention.
Figure 4:
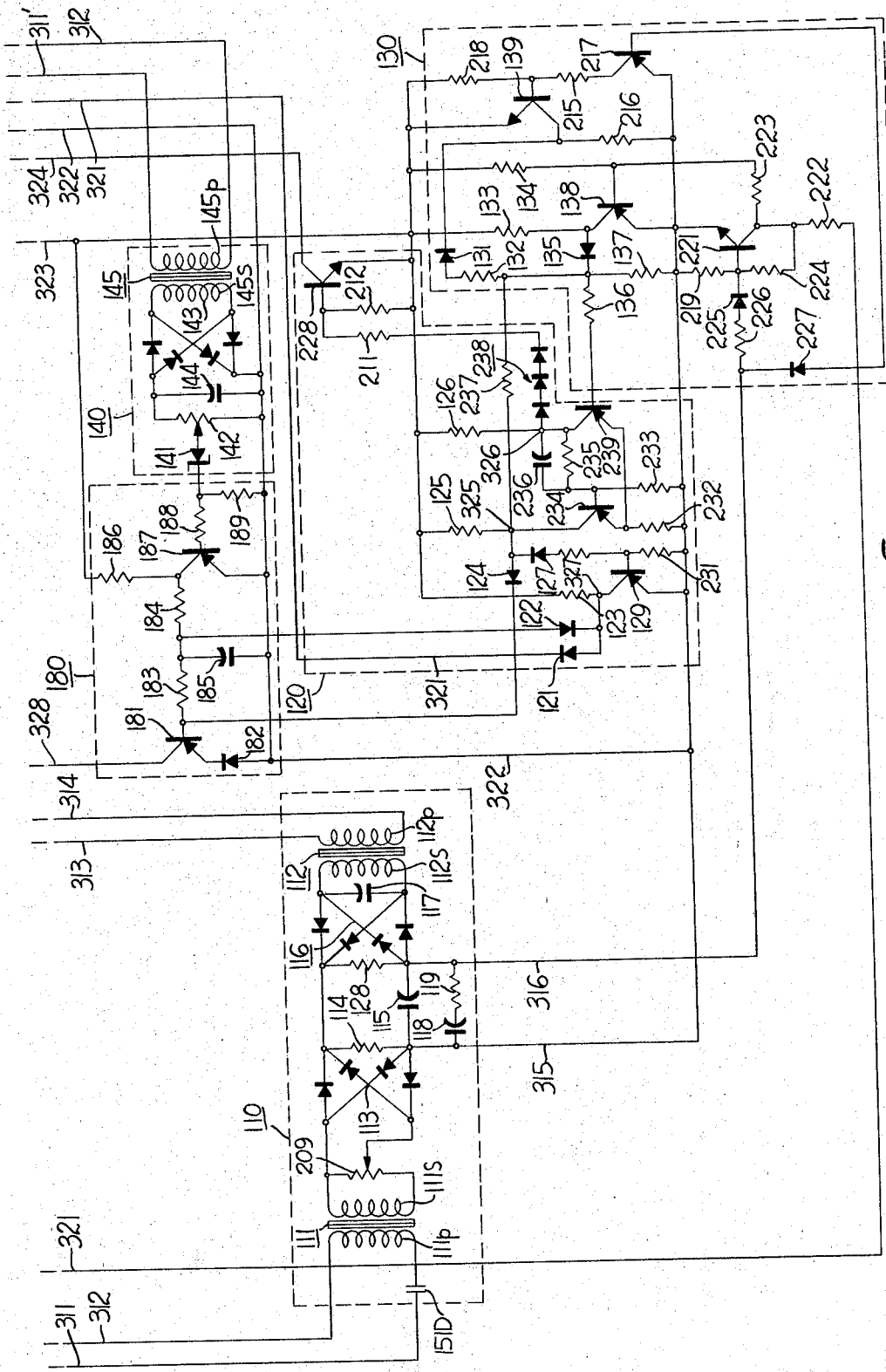
FIG. 4 is a schematic drawing of an embodiment of another portion of a circuit of this invention.

Referring to FIGS. 2, 3 and 4, an A.C. power source 10 is connected to a load 20 through a switch circuit 50. A D.C. source comprising a battery 90 and a battery charger 60 (FIG. 3) is provided to furnish power upon failure of A.C. power source 10.

Static output means are provided to produce the necessary A.C. power from the D.C. source upon failure of the A.C. power source. The static output means comprises power means for inverting the D.C. power and output control means for controlling the power means to maintain a power means output of sufficient power to properly operate the load.

The output control means, which comprises an output sensing circuit 140 and a driver control circuit 180, is connected to load 20 to continuously sense the current flow through the load so that upon switching from the A.C. power source to the D.C. source the required power will be instantly furnished at the desired level.

The power means comprises an inverter circuit 160 and a driver circuit 170 for controlling the inverter circuit.

A control means is provided for sensing the condition of the A.C. power source and for controlling the standby system to supply the load from the A.C. power source or the D.C. source in response to the conditions of the A.C. power source and D.C. source. The control means comprises switching means, reference signal means, synchronizing means, voltage sensing means and protection means.

The switching means, which comprises switch circuit 50 and bypass relay 80, is provided for connecting or disconnecting the A.C. power source from the load, and is controlled by other portions of the control means.

The reference signal means, which comprises an oscillator circuit 100, is provided for producing a reference signal of predetermined amplitude and wave shape that is compared to the A.C. power source output to determine the condition or voltage of the A.C. power source. The reference signal is of a controlled frequency and is used as a control frequency for the A.C. power produced by inverter circuit 160.

The oscillator is tuned to have a slightly different frequency from the A.C. power source. Thus, when the A.C. power source is restored, the switching of the load back to the A.C. power source is selected to occur at the precise moment the A.C. power source and the inverter are in phase.

The synchronizing means is provided for synchronizing the A.C. power source output and the inverter output when switching from one power source to the other. The synchronizing means comprises a reference phasing control means and a phase synchronizing means.

Figure 5:
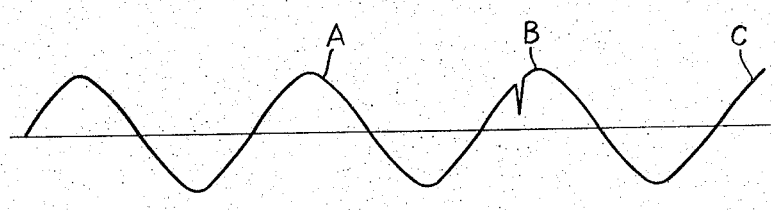
FIGS. 5, 6, 7 and 8 show wave forms appearing in various parts of the circuitry of the system.

The reference phasing control means provides for synchronization when switching from the A.C. power source to the D.C. source. This is accomplished by connecting the A.C. power source to control the oscillator frequency and somewhat by feeding back power from the load through inverter 160 to oscillator 100. Thus, when the inverter is energized to supply A.C. power to the load and the A.C. power source is disconnected from the load, the inverter output is at this instant in phase with the A.C. power source. The power that is delivered to the load will be practically continuous. This is shown in FIG. 5 where curve A is the A.C. power source output, point B is the point where switching to the D.C. source occurs, and curve C is the output of the inverter. The reference phasing control means becomes inoperative after switchover to inverter power and the tuned frequency of the oscillator controls the frequency of the inverter A.C. power. Therefore, curve C is of a slightly different frequency than curve A.

The phase synchronizing means, which comprises synchronizing circuit 150, is provided for switching the load from the inverter output to the A.C. source when they are in phase. Since the tuned frequency of the oscillator, and therefore the frequency of the inverter output, is slightly different from the frequency of the power source, the two frequencies will coincide in phase angle relationship within a short period of time after restoration of the A.C. power source. The phase synchronizing means responds to the phase relationship to effect the connection thereby restoring the standby system to a standby status. The system is then again ready to switch back to operation from the D.C. source if the A.C. power source should again fail.

The voltage sensing means is provided for sensing the condition of the A.C. power source output to effect energizing of the load from the D.C. source when the A.C. power source output drops to a predetermined level. The voltage sensing means comprises an instantaneous voltage comparison means and a voltage level sensing means.

The instantaneous voltage comparison means is provided for substantially instantaneously sensing a deviation in the wave form of the A.C. power source output. The instantaneous voltage comparison means comprises voltage comparison circuit 110, a pulse circuit 130, and a voltage sensing control circuit 120.

Figure 6:
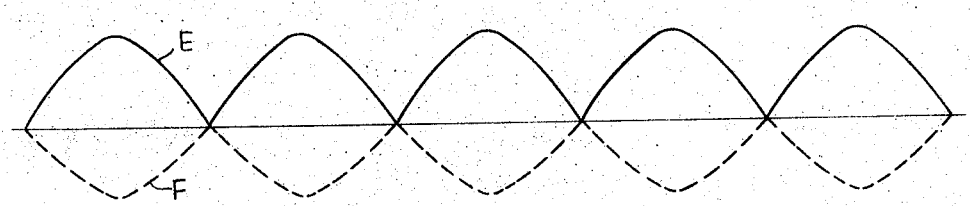
Figure 7:
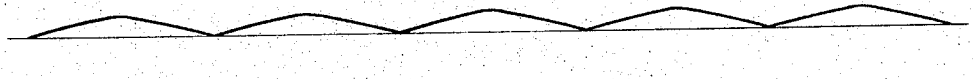

Voltage comparison circuit 110 receives a measure of the A.C. power source output and the reference signal and compares them to produce an output varying as a function of the A.C. power source and the reference signal. By selecting the amplitude and wave shape of the reference signal, the output of the voltage comparison circuit can be selected to indicate an instant deviation from the desired wave form. Normally, an instantaneous drop of the A.C. power source voltage below a predetermined level is sensed to produce a voltage comparison circuit output reflecting the amount of this drop. FIG. 6 shows how the A.C. power source output and the reference signal are compared with curve E being the A.C. power source signal and curve F the reference signal. FIG. 7 shows a resultant output from the voltage comparison circuit.

Figure 8:

Pulse circuit 130 responds to the voltage comparison circuit output to produce pulses of one polarity when the A.C. power source is at the required voltage within preselected limits as shown in FIG. 8; and to produce pulses of an opposite polarity when the voltage of the power source is not of the required voltage.

Voltage sensing control circuit 120 responds to the polarity of the pulses of the pulse circuit to effect switching of the switching means and to control the energization of the output means by the D.C. source.

The voltage level sensing means, which comprises a relay circuit 30, is provided for more slowly responding to a continuous predetermined low voltage of the A.C. power source output. The level is selected to be higher than the instantaneous level that would affect the instantaneous voltage comparison means. Thus, the voltage sensing means responds to an instantaneous voltage drop that would adversely affect the load and also responds to a lesser voltage drop that would adversely affect the load only if it continued for a predetermined longer period of time.

The protection means, which comprises a battery disconnect circuit 70 and a timing means 40, is provided for making the standby system inoperative if the battery voltage is below a predetermined level. This prevents abnormal operation that could result from supplying load power from a weak D.C. source and prevents complete discharge of the battery.

Battery disconnect circuit 70 responds to a predetermined minimum voltage level of the battery to open switch circuit 50 through the operation of a bypass relay contact 80A of a bypass relay 80. At the same time the battery is disconnected from the remainder of the standby system to prevent further discharge of the battery.

Timing means 40 is provided to similarly connect the A.C. power source to the load and disconnect the battery from the rest of the system after a predetermined continuous interval of energization of the load from the D.C. source. The interval may be selected to prevent excessive discharging of the battery when the time required for load operation after failure is known. For example, the load may be emergency equipment used to switch in alternate power sources and the need for energizing may end after a short interval. In this case it would be advisable to disconnect the battery after these functions are completed rather than allow the standby system to operate until the battery voltage drops sufficiently to affect battery disconnect circuit 70.

Means are provided by a battery charger 60 for maintaining the battery at its full charge. Battery charger 60 receives A.C. power from the A.C. source along conductors 311 and 312 at a primary winding 62p of a transformer 62. A secondary winding 62s produces an output which is rectified by a full wave rectifier 61. The rectified power is applied to battery 90 through a silicon controlled rectifier 66 that is triggered into conduction by a transistor 65 across a resistor 64 when battery voltage falls below the adjusted voltage of a zener diode 82. A resistor 67 is connected in series with SCR 66 to limit the charging current pulses to a predetermined maximum. A resistor 63 keeps SCR 66 turned off when transistor 65 is turned off. An adjustable resistor 83 permits small deviations from the voltage rating of zener diode 82. Transistor 65 is turned on at a level determined by a bias resistor 68.

In the following description of the circuitry the operation of the standby system shall be called "normal" when the load is being powered by A.C. power source 10 and the operation shall be called "emergency" when the load is being powered by battery 90.

When the system is turned on for normal operation, relay circuit 30 receives power from A.C. power source 10 along conductors 311 and 312 and activates synchronizing circuit 150 (FIG. 3) which then operates to place the standby system in a readiness condition. Battery 90 is connected into the circuitry and supplies power to oscillator circuit 100. The oscillator circuit is then ready to provide power for the operation of other portions of the system and also provides a reference signal of a predetermined level and wave shape. The reference signal is conducted along oscillator conductors 313 and 314 to voltage comparison circuit 110.

Voltage comparison circuit 110 receives this reference signal and also receives the A.C. power source output along conductors 311 and 312 and compares the A.C. power source output to the reference signal. Voltage comparison circuit 110 furnishes a resultant output along sensing conductors 315 and 316 to pulse circuit 130. Pulse circuit 130 analyzes the output from voltage comparison circuit 110 and supplies this information to voltage sensing control circuit 120. Voltage sensing control circuit 120 produces an output that indicates to the remainder of the circuitry that the condition is one of normal operation (or emergency operation).

During normal operation the remainder of the circuitry is not activated. During emergency operation voltage sensing control circuit 120 energizes driver circuit 170 by connecting it to the battery. At the same time driver control circuit 180 and inverter circuit 160 are energized and brought under control of output sensing circuit 140. Also, A.C. power source 10 is disconnected from the load through switch circuit 50 and the load is powered along conductors 311' and 312 by inverter circuit 160. The changeover from the A.C. power source to the D.C. source supplying A.C. power is very rapid and takes less than one-half millisecond. FIG. 5 shows the wave form of the A.C. power source output, sine wave A, and the power produced by the system, sine wave C, when the A.C. source fails. The system also attempts to make up for lost time by instantly increasing its voltage output to a point where it would have been if the voltage of the normal A.C. power source would have been continued at a normal level. This is also shown in FIG. 5 by the sharp drop and rise back to the voltage of the normal sine wave at the changeover point, point B.

Referring to FIGS. 2, 3 and 4, to place the system in standby status, A.C. power from source 10 is applied across terminals 311 and 312. Switches 11 and 12 (adjacent battery 90) are closed to ready the standby system by applying battery potential to conductors 318 and 319. At the instant of connecting the A.C. power source to conductors 311 and 312 the current flows through normally closed contact 80A and conductors 311 and 311' to load 20.

Contact 80A is a normally closed contact of bypass relay 80 that opens when timing relay 41 has operated to close a contact 41A in response to the applied A.C. power and in response to the closing of switches 11 and 12. The closing of contact 41A energizes relay 80 only if a contact 72B of a battery disconnect relay 72 is closed. When the battery charge level drops below a predetermined minimum level, contact 72B opens to deenergize bypass relay 80 (thereby closing contact 80A) and to disconnect the battery from the remainder of the circuitry. The system is then inoperative and source 10 is connected to load 20 through contact 80A regardless of the output level or condition of source 10.

During emergency when power from source 10 is present, power is supplied along conductors 311 and 312, 323 to energize relay circuit 30. Relay circuit 30 comprises a control relay 31 that has three contacts: contact 31A in relay circuit 30; contact 31B in synchronizing circuit 150, and contact 31C in timing means 40. Control relay 31 receives current through a full wave rectifier 32 from the A.C. power source along conductors 311 and 312. A resistor 33 and a variable resistor 34 are connected in series with the full wave rectifier and upon application of A.C. power a circuit is completed through the resistors and a normally closed contact 151A of synchronizing relay 151 in synchronizing circuit 150. Upon energization of control relay 31, contact 31A closes and locks in relay 31. When relay 31 is locked in, it then functions as a voltage level sensing device, as explained. A variable resistor 35 is adjusted so that the contacts of control relay 31 open when the A.C. power source voltage drops below a certain level. Control relay 31 operates at a comparatively slow rate extending over several cycles.

When control relay 31 is energized it also closes contact 31B in synchronizing circuit 150. Synchronizing circuit 150 comprises a synchronizing relay 151 connected in series with a variable resistor 152, a capacitor 153 connected in parallel with the coil of synchronizing relay 151, a full wave rectifier 154, and a secondary winding 155s of a transformer 155. Synchronizing circuit 150 receives power from A.C. source 10 through secondary winding 155s of transformer 144 and a secondary winding 169s of a transformer 169. Upon closing of contact 31B synchronizing relay 151 is energized to open its normally closed contact 151A and close its normally open contacts 151B, 151C and 151D, provided voltages of windings 169s and 155s are essentially in phase, as will be later explained.

Contact 151A is located in relay circuit 30 and when opened places relay circuit 30 in a ready state to sense voltage.

Contact 151B is located in timing means 40 and is closed to complete a circuit from the A.C. power source across timing realy 41. (The other contact in timing circuit 40, contact 31C, has been closed by the activation of control relay 31.) Upon completion of the circuit through timing relay 41, its contact 41A, located in battery disconnect circuit 70, is closed.

Upon energization for normal operation, timing relay 41 operates to close its contact 41A within a very few seconds after A.C. power from source 10 is present and contacts 31C and 151B are closed. The closing of contact 41A connects the battery to conductor 323 if contact 72B is closed.

During emergency operation, timing relay 41 operates after a selected period of time of emergency operation to open its contact 41A to disconnect the battery from conductor 323 and the remainder of the circuitry. This timing operation is optional and is utilized to save the battery from total discharge or to limit its time of operation. In the system shown in the drawings, source 10 is automatically reconnected to load 20 at the end of the timed period (when contact 41A opens).

Contact 151C in switch circuit 50, when closed, connects A.C. power source 10 along conductor 311 through a primary winding 21p of a transformer 21 along conductor 311' to load 20. The normally closed contact 80A is open during standby (normal) operation.

Contact 151D in voltage sensing circuit 110, when closed, connects a primary winding 111p of a transformer 111 to A.C. source 10 along conductors 311 and 312.

After connection of the A.C. power source to the system, battery 90 is still not connected to the remaining circuitry because contact 72B in battery disconnect circuit 70 is still open. In order to close this contact, a push button switch 74 must be depressed to energize battery disconnect relay 72. This completes a circuit from the negative terminal of the battery, conductor 319, through switch 74 and the coil of battery disconnect relay 72 along conductor 318 to the positive terminal of the battery. This closes a contact 72A thereby maintaining the relay in an energized condition with current flowing from the negative terminal of the battery along conductor 319 through contact 72A, resistor 73, and the coil of relay 72 to the positive terminal of the battery along conductor 318. Resistor 73 is selected so that battery disconnect relay 72 will drop out if the battery voltage is below a predetermined level. Therefore, unless the battery is charged to this predetermined minimum level, voltage relay 72 will deenergizse when push button switch 74 is opened to open contacts 72A and 72B. Since push button switch 74 is normally open, relay 72 will be deenergized at any time that battery voltage drops below this predetermined minimum level. A capacitor 71 is connected across relay 72 to prevent relay deenergization on sharp voltage dips of short duration which may result from operation of the subsequent circuitry. Deenergization of relay 72 opens contact 72B and deenergizes bypass relay 80 to close contact 80A and directly connect source 10 to load 20.

A capacitor 79 prevents relay 80 from dropping out on voltage dips.

A resistor 76, a diode 77, and a zener diode 78 function to provide potentials required for operation of portions of the circuitry of the system. A zener diode 78 provides a stable D.C. supply for the circuitry independent of battery voltage fluctuations.

When contact 72B closes, all the subsequent circuitry is connected to the battery through closed contact 41a along conductor 323. A large capacitor 91 is connected across the terminals of the battery to help in reducing the voltage dips during current surges that might otherwise deenergize relay 72.

A third contact 72C is connected across A.C. source 10 in series with an indicating light 17. Light 17 goes on and stays on if the battery has sufficient voltage to keep relay 72 energized and if the A.C. source 10 is delivering power. Therefore, light 17 serves as a means for indicating that both the A.C. voltage source is present and that the battery has a sufficient charge for operation.

Battery 90 furnishes D.C. power along conductors 318, 323 and 319 to oscillator circuit 100, driver circuit 170, and inverter circuit 160.

Upon connection to the battery, oscillator circuit 100 immediately begins furnishing the reference signal, a sine wave voltage, along conductors 313 and 314 to voltage comparison circuit 110 at a primary winding 112p of a transformer 112.

In the operation of oscillator circuit 100, transistors 105 and 108 are controlled by their respective R-C circuits of resistor 99 and capacitor 109 and resistor 98 and capacitor 97. The oscillating frequency is principally determined by the reactance of a primary winding 96b of a transformer 96 and the capacitance of a capacitor 104. A capacitor 101 is connected in series with a variable resistor 102 to provide for accurate adjustment of the frequency of the sine wave to slightly above or below the frequency of normal power source.

Primary winding 96p of transformer 96 is connected to primary winding 112p of transformer 112. The reactance of the two windings must be taken into account in adjusting the frequency of the oscillator.

The emitters of transistors 105 and 108 are connected to the positive terminal of the battery through resistors 106, 107 and 103, conductor 322 diode 77, and resistor 76. By properly selecting the capacitance, reactance, and resistance values in the circuit, the oscillator will produce an output sufficiently accurate in frequency for this particular type of application. Oscillator circuit 100 is locked into synchronization with the alternating current from power source 10 when the A.C. power source is connected to voltage comparison circuit 110.

The reference signal from oscillator circuit 100, delivered to winding 112p of transformer 112, appears across a secondary winding 112s. The voltage appearing across secondary winding 112s is filtered by a capacitor 117 and rectified by full wave rectifier 116. This voltage appears across a resistor 128 as shown by curve F in FIG. 6.

A secondary winding 111s of transformer 111 in voltage comparison circuit 110 is connected to source 10 along conductors 311 and 312 and is rectified by full wave rectifier 113 to produce a signal, curve E, shown in FIG. 6, across resistor 114. A variable resistor 209 is connected to adjust the voltage appearing at resistor 114 so that the two voltages, appearing across resistors 114 and 128, may be appropriately balanced for comparison. In this manner the voltage of source 10 and the reference signal are instantly compared to determine if the A.C. source voltage has dropped below a predetermined level. The resultant output of the comparison circuit appears as shown in FIG. 7 for the example curves of FIG. 6.

A resistor capacitor network in voltage comparison circuit 110, comprising capacitors 115 and 118 and a resistor 119, serves a dual function. First, it controls the response of secondary winding 112s so that it feeds back to oscillator 100 and locks the oscillator output in with the alternating current from source 10. Second, it receives the difference of the voltages across resistors 114 and 128. Resistor 209 is adjusted so that the output from voltage comparison circuit 110, which is delivered along conductors 315 and 316, is positive when the voltage of power source 10 is above a predetermined minimum level. When the power source voltage is below this minimum level the output along conductors 315 and 316 is negative.

This output from voltage comparison circuit 110, positive for normal operation and negative for emergency operation, is supplied to pulse circuit 130. This output is a half cycle pulse output, as shown in FIG. 7. These half cycle pulses are applied to the base of a transistor 221 through a resistor 226 and a diode 225. If the pulses, which appear across resistors 222 and 224, are positive, the positive voltage repeatedly turns on transistor 221. Resistor 224 is primarily a bias resistor providing negative feedback action that helps to improve the transistor small signal response and a resistor 219 provides proper cutoff for transistor 221. A voltage divider formed by series connected resistors 222, 223, and 134 is connected between the positive and negative terminal of the battery along a conductor 321 (through a resistor 76 in battery disconnect circuit 70) and conductor 323. The turning on of transistor 221 makes the base of a transistor 138 negative across resistors 223 and 134.

Making the base of transistor 138 negative turns it on to pass a positive pulse appearing across a resistor 133, through diode 135 and a resistor 136 to the base of a transistor 239 in output control circuit 120.

In a similar manner, diodes 227 and 131 and transistors 217 and 139 acting with resistors 215, 218, 216 and 132 operate to produce negative pulses which are applied to the base of transistor 239 when the output voltage from voltage comparison circuit 110 is negative.

Thus, during normal operation, pulse circuit 130 supplies positive square wave pulses (FIG. 8) to the base of transistor 239 and during emergency operation pulse circuit 130 supplies negative square wave pulses to the base of transistor 239.

Voltage sensing control circuit 120 comprises a bistable flip-flop circuit of the Schmitt Trigger type. The flip-flop circuit is made up of transistor 239 and a transistor 234; resistors 126, 125, 235, 233 and 232; and capacitor 236. A feedback resistor 237 and bias resistor 137 are added to improve stability.

The bistable characteristic of the flip-flop circuit in voltage sensing control circuit 120 identically follows the two states of operation of the standby power supply system as indicated by the pulses from pulse circuit 130, that is, it places the system in normal operation when the pulses are positive and places it in emergency operation when the pulses are negative.

When transistor 239 is turned on, it turns off transistor 234 and when transistor 239 is turned off, it turns on transistor 234. Since transistor 239 turns off when it is receiving positive pulses (normal operation) transistor 234 is turned on and a point 325 assumes a potential, which is slightly less positive than the battery positive terminal, across resistor 232 and resistor 76 and a diode 77 (FIG. 3, circuit 70) connected by conductors 315 and 322.

A diode 127, resistor 128 and a resistor 231 are selected to permit a transistor 129 to turn off when transistor 234 is turned on. When transistor 129 is turned off diodes 121 and 122 are connected to a point 327 and to the negative terminal of the battery through a resistor 123 along conductor 323. A series diode circuit 238 and a point 326 are connected through resistor 126 to the negative terminal of the battery along conductor 323.

When transistor 234 is turned on (normal operation) diode 124 passes positive potential from the battery to the base of a transistor 181 (in driver control circuit 180) to turn it off. This blocks current flow to driver circuit 170. A capacitor 185 is substantially charged through diode 122 across resistor 123. Since transistor 181 is turned off, point 327 becomes negative because resistor 123 is connected to the negative terminal of the battery along conductor 323. The negative charge on capacitor 185 holds driver control circuit 180 and output sensing circuit 140 inoperative because the base of transistor 181 is held to the positive potential through diode 124 and conducting transistor 234 to conductor 322.

Diode 121 controls switch circuit 50. When transistor 129 is turned off (normal operation), diode 121 is reverse biased thereby controlling switch circuit 50.

When the input to pulse circuit 130 from voltage comparison circuit 110 is negative (emergency operation), transistor 217 (circuit 130) receives negative half cycle pulses through diode 227 and is alternately turned on and off. These pulses are amplified by transistor 139 which has its base connected to a voltage divider comprising resistors 218 and 215. When transistor 139 is turned on, a strong negative potential from the negative terminal of the battery along conductor 323 is conducted from the emitter to the collector of transistor 139 through diode 131, resistor 132, and resistor 136 to the base of transistor 239. Voltage sensing control circuit 120 is thereby turned on to change the system to emergency operation.

When transistor 239 receives a negative pulse it is turned on, transistor 129 is turned on and transistor 234 is turned off. Transistor 129 turns on because negative potential is supplied to its base from conductor 323 through resistor 125, diode 127 and resistor 128. Diode 121 then passes positive potential to a transistor 23 in switch circuit 50. This changes switch circuit 50 from its on to off condition.

Also, diode 122 is now reverse biased and capacitor 185 is released and brought under the control of driver control circuit 180. Diode 124 is also reverse biased making the base of a transistor 181 negative across a resistor 183 by the charge previously built up on capacitor 185. A diode 182 is connected to provide cutoff potential for transistor 181. The negative charge of capacitor 185 is controlled by a transistor 187, resistors 184, 186, 188 and 189 and zener diode 141 (in output sensing circuit 140) through the operation of output sensing circuit 140.

Output sensing circuit 140 comprises a variable resistor 142, a full wave rectifier 143, a capacitor 144, and a transformer 145 with a primary winding 145p and a secondary winding 145s. Secondary winding 145s is in the output sensing circuit and primary winding 145p is connected through conductors 311′ and 312 directly to load 20.

Transistor 181 is turned on by the discharge current from capacitor 185 flowing through resistor 183. Transistor 181 controls driver circuit 170. The A.C. output of the system is therefore controlled by transistor 181 and can be adjusted to maintain A.C. output voltage at a constant level at the instant of transfer if constant load conditions prevail or it can be adjusted to produce the maximum available output.

During emergency operation, referring to output control circuit 120, transistor 239 is turned on and diode circuit 238 is connected through transistor 239 to the positive terminal of the battery through resistor 232. The positive terminal is then connected through a resistor 211 to the base of transistor 228 which is then turned on to supply driver circuit 170 with the necessary negative potential from conductor 323 through conductor 324. This negative potential is utilized for crossover current correction.

Driver circuit 170 comprises a first driver stage and a second driver stage. The first driver stage receives an input from transistor 181 in driver control circuit 180 along conductor 328 and receives another input from oscillator circuit 100 at secondary winding 96s of transformer 96. The first driver stage comprises capacitors 94, 175, 176; resistors 95, 93, 157, 158, 171, 92, 174 and 173; transistors 159 and 172; and a primary winding 177p of a transformer 177. Capacitor 94 is used to balance transformer impedance and therefore improve response time as well as wave form. Capacitors 175 and 176 are used as bypass capacitors for resistors 174 and 173, respectively. Resistors 157 and 158 are utilized for crossover current correction which is partially accomplished at this point in the circuit. The circuit parameters are selected to avoid saturation of transformer 177 and transistors 159 and 172 in order to preserve the sine wave output at its maximum power level.

The second driver stage of driver 170 comprises transistors 207, 208, 213 and 214; resistors 201, 202, 203 and 204; capacitor 178; diode 179, and a secondary winding 177s of transformer 177. Capacitor 178 functions to balance the transformer impedance. Diode 179 is forward biased and limits the negative bias applied to the bases of transistors 207, 208, 213 and 214 to further accomplish crossover current correction by limiting the voltage drop across resistor 202. The transistors of the second driver stage of driver circuit 170 operate as emitter follower amplifiers. The voltage drops across resistors 203 and 204 are applied to the bases of transistors 161 and 168, respectively, in inverter circuit 160.

Inverter circuit 160 comprises transistors 161, 168, 162, 163, 167 and 166; diodes 164 and 165; and resistors 205 and 206. The power transistor arrangement in inverter and 206. The power transistor arrangement in inverter circuit 160 avoids the use of transformers and provides for excellent stability and speed. Diodes 164 and 165 prevent collector potential reversal of the transistors. The power transistors provide secondary winding 169s of transformer 169 with sine wave voltage and current of a magnitude that furnishes A.C. power to load 20 at a primary winding 169p.

In the operation of inverter circuit 160 a means for accomplishing crossover current correction is provided. In order to conserve power, the crossover current correction is primarily applied to the second driver stage of driver circuit 170 at the instant the unit is switched to emergency operation. The correction is obtained by applying negative bias to the bases of transistors 207 and 208 and transistors 213 and 214 through transistor 228 along a conductor 324, as controlled by diode circuit 238. A resistor 212 is connected to provide proper cutoff for transistor 228 (at normal operation transistor 239 is turned off and diode circuit 238 is reversed biased so that a resistor 212 provides negative bias to turn off transistor 228).

When the system switches to emergency operation, switch circuit 50 disconnects source 10 from load 20. Switch circuit 50 comprises transformer 21 with primary winding 21p connected in the power line across conductors 311 and 311′. The primary winding is therefore in series with source 10 and load 20 when contact 151c is closed (normal operation). The transformer is designed so that a secondary winding 21s passes very little current through the primary winding when it is opened, that is, it functions like a simple series reactor with relatively high reactance. In normal operation winding 21s is short circuited by a pair of back to back power transistors 18 and 39 with collector resistors 25 and 38 and diodes 48 and 37. Capacitors 19 and 26 are used as coupling capacitors. Diodes 48 and 37 prevent reversal of transistor collector voltage which may have a damaging effect on the transistors.

The base of each power transistors 18 and 39 is respectively connected by resistors 27 and 28 to a typical two stage amplifier comprising transistor 23, a transistor 22, a diode 24, a resistor 16 and a resistor 15.

Base control current for power transistors 18 and 39 is obtained from secondary winding 21s of transformer 21 and from a secondary winding 47s of a transformer 47. A diode 45, a diode 46, and a capacitor 44 complete the power source. Diodes 42 and 43 are steering diodes which direct the current to the proper transistor alternately each half cycle. When diode 121, in output control circuit 120, is reverse biased (normal operation), resistor 15, connected between the base and collector of transistor 23, turns on control circuit 50 by making transistor 22 conductive.

When transistor 22 is conducting, transistors 18 and 39 are also conductive. The low impedance of the short circuited secondary winding 21s is reflected in the primary winding which carries the load current with only a very few volts drop between conductors 311 and 311′.

When the power source fails, diode 121 (pulse circuit 130) no longer reverse biases transistor 23 (switch circuit 50). Transistor 23 is then turned off and this stops the operation of transistors 18 and 39 thereby removing the short circuit across secondary winding 21s. This creates a large impedance in transformer 21 which appears in primary winding 21p and prevents current flow from source 10 to load 20.

When the A.C. power sources fails, A.C. power is produced by inverter circuit 160 at primary winding 169p of transformer 169 and delivered along conductors 311′ and 312 to load 20. Also, relay circuit 30 responds to the power failure and its control relay 31 is deenergized to open its contacts 31A, 31B and 31C thereby completing the changeover to emergency operation.

If normal power is restored the system will automatically return to normal operation and commence charging battery 90 and return to standby status ready for emergency operation if the power should again fail.

Upon restoration of A.C. power, relay 31 is energized and its contact 31B (synchronizing circuit 150) reconnects relay 151 to secondary winding 169s of transformer 169. Since primary winding 169p is connected to load 20, and a primary winding 155p of transformer 155 is connected to power source 10, relay 151 is exposed to the instantaneous sum or differences of the two A.C. voltages appearing at the secondary windings 169s and 155s. Resistor 152 is adjusted so that relay 151 is activated when full wave rectifier 154 delivers a predetermined voltage. This predetermined voltage is selected as the maximum voltage that occurs when the voltage of source 10, appearing at secondary winding 155s, and the A.C. produced at secondary winding 169s, from inverter circuit 160, are in phase. Since the output of inverter circuit 160 is of a slightly different frequency than the A.C. source, normal operation is restored only at the instant that maximum voltage is obtained and the two A.C. sources are in phase. Capacitor 153 provides a small time delay to give relay 151 more positive action at the point of synchronization.

When the two voltages are in phase, relay 151 is activated and its contact 151B closes to energize timing relay 41 which in turn closes contact 41A to activate relay 80 and open contact 80A and place switch circuit 50 in the power line. Contact 151A then opens and activates control relay 31, and contact 151D reconnects primary winding 111p of transformer 111 to voltage source 10 thereby providing voltage comparison circuit 110 with voltage from winding 111s. The output voltage of voltage comparison circuit 110 then goes from negative to positive and the circuit then operates in a normal condition as previously described.

Figure 1:
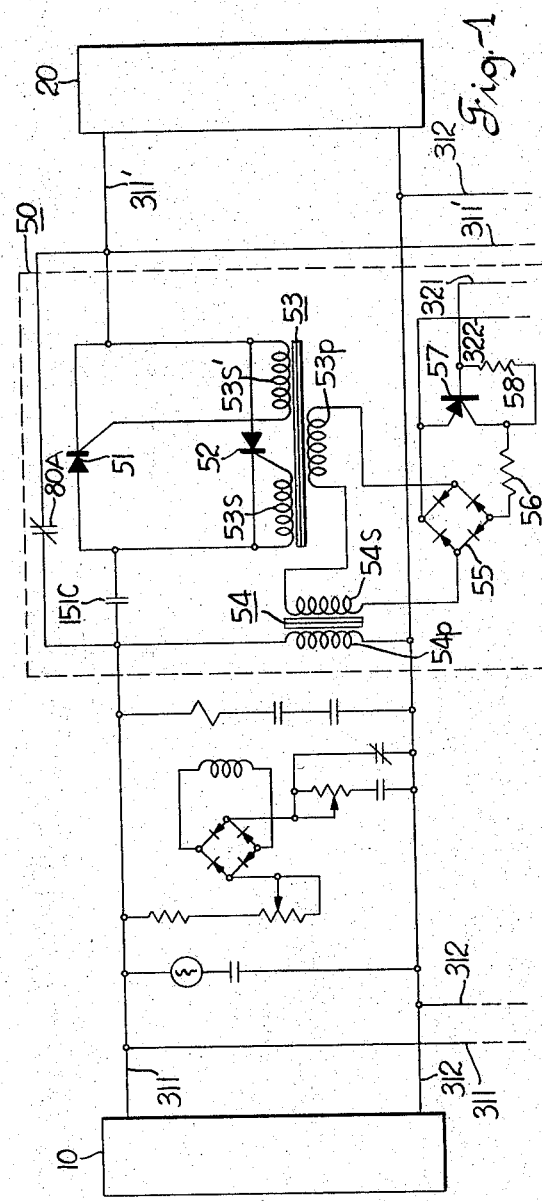
FIG. 1 is a schematic drawing of an embodiment of a portion of a circuit of this invention.

Switch circuit 50 shown as FIG. 2, may be replaced by a circuit 50′ shown as FIG. 1. This circuitry functions to disconnect power source 10 from load 20 as does control switch circuit 50.

Referring to FIG. 1, during normal operation a primary winding 54p of transformer 54 is connected to power source 10 and a secondary winding 54s is connected in series with a full wave rectifier 55, a resistor 56, a transistor 57 and a primary winding 53p of a transformer 53. A resistor 58 is connected to keep transistor 57 turned on so that current is flowing through primary winding 53p. Silicon controlled rectifiers 51 and 52 are alternately turned on each half cycle by the output voltage across secondary windings 53s and 53s′ of transformer 53.

During emergency operation the base of transistor 57 receives a positive signal from voltage sensing control circuit 120, as explained previously, when the reverse biasing of diode 121 in output control circuit 120 is removed. Transistor 57 is then turned off. On failure of the normal power source and production of A.C. power from the inverter circuit, current flowing through the SCR that is momentarily conducting instantly reverses and power will cease to flow across circuit 50′. The SCR is not turned on again until transformer 53 is energized by transistor 57 when voltage sensing control circuit 120 returns to normal operation to reverse bias diode 121.

In describing the invention the preferred embodiment has been shown and described but it is obvious to one skilled in the art that there are many variations, combinations, alterations that may be made without departing from the spirit and scope of the invention.

The embodiments of the invention in which an exclusive property or privilege is claimed are defined as follows:

1. A standby A.C. electrical power supply system connectable to an A.C. power source, to a direct current source, and to a load, said system comprising:
    reference signal means for producing an alternating reference signal having a predetermined amplitude;
    static output means connected to the load, said output means energizable by the direct current source and controllable by the reference signal means to substantially instantaneously furnish electrical power to the load;
    voltage sensing means responsive to a measure of the A.C. power source output and the reference signal for producing an output indicating the difference in amplitude between the measure of the reference signal and the A.C. power source output;
    switching means for connecting the A.C. power source to and disconnecting the A.C. power source from the load, said switching means responsive to the voltage sensing means output when said output indicates a predetermined level of the A.C. power source to disconnect the A.C. power source from the load and to energize the output means by the direct current source.

2. A standby A.C. electrical power supply system according to claim 1 wherein said alternating reference signal is also produced at a frequency slightly different than the frequency of the A.C. power source, and
    said static output means furnishes electrical power at the frequency of the reference signal to the load upon energization; and
    wherein said system also comprises reference phasing control means for controlling the reference signal means to maintain the reference signal at the same frequency and in phase with the A.C. power source when the load is connected to the A.C. power source.

3. A system according to claim 1 also comprising phase synchronizing means connected to the load and to the A.C. power source and operable when the load is powered by the output means for producing a switching signal when the A.C. power source exceeds a predetermined voltage level and the A.C. power source and the output means are in phase; and
    wherein said switching means are responsive to the voltage sensing means output to disconnect the A.C. power source from the load and responsive to the phase synchronizing means switching signal to connect the A.C. power source to the load.

4. A system according to claim 2 wherein the voltage sensing means comprises
    voltage comparison means for comparing the A.C. power source output to the reference signal, said comparison means responsive to a preselected instantaneous difference between the A.C. power source output and the reference signal for controlling the switching means to disconnect the A.C. power source from the load and to energize the output means, and
    voltage level sensing means connected to the A.C. power source and responsive to a minimum average voltage of the A.C. power source output for a preselected time for effecting disconnection of the A.C. power source from the load and energization of the output means.

5. A system according to claim 2 also comprising phase synchronizing means operable when the A.C. power source output exceeds a preselected level and the load is powered by the output means for instantaneously connecting the load to the A.C. power source and for deenergizing the output means when the A.C. power source and the output means are substantially in phase.

6. A system according to claim 5 wherein the D.C. source comprises a battery and wherein the voltage sensing means comprising a voltage comparison circuit connected to receive the reference signal and a measure of the A.C. power source output for producing an output proportional to the instantaneous difference of the reference signal and the A.C. power source output, a pulse circuit for producing output pulses of one polarity when the voltage comparison circuit output is greater than a predetermined voltage and output pulses of an opposite polarity when the voltage comparison circuit output is less than said predetermined voltage, and a voltage sensing control circuit connected to the switch circuit and the output means and connected to receive the pulse circuit output pulses for deenergizing the output means and controlling the switch circuit to connect the A.C. power source to the load when said output pulses are of said one polarity, and for producing the voltage sensing means switching signal to instantaneously disconnect the A.C. power source from the load and instantaneously energize the output means when said output pulses are of said opposite polarity; and wherein said system also comprises protection means connected to the battery for deenergizing the output means and connecting the A.C. power source to the load in response to a predetermined condition of the battery.

7. A system according to claim 4 wherein the voltage sensing means also comprises voltage level sensing means connected to the A.C. power source and responsive to a minimum continued voltage of the A.C. power source to disconnect the A.C. power source output from the voltage comparison circuit and effect disconnection of the A.C. power source from the load and energization of the output means.

8. A system according to claim 3 wherein the voltage sensing means comprises a voltage comparison circuit connected to receive the reference signal and a measure of the A.C. power source output for producing an output indicating the instantaneous difference between the reference signal and the A.C. power source output, a pulse circuit instantaneously responsive to the voltage comparison circuit output for producing output pulses of one polarity when the voltage comparison circuit output is greater than a predetermined level and output pulses of an opposite polarity when the voltage comparison circuit output is less than said predetermined level, a voltage sensing control circuit connected to the switching means and the output means and connected to receive the pulse circuit output pulses for controlling the switching means to disconnect the A.C. power source from the load and for energizing the output means instantaneously when said output pulses are of said opposite polarity, and voltage level sensing means connected to the A.C. power source and responsive to a minimum voltage of the A.C. power source output for controlling the switching means to disconnect the A.C. power source from the load and for effecting the energization of the output means.

9. A standby A.C. power supply system connectable to an A.C. power source, to a D.C. source, and to a load, said system comprising an inverter circuit energizable by the D.C. source for producing an A.C. power output;

a driver circuit connected to the inverter circuit for controlling the inverter circuit;

an output control means connected to the load and to the driver circuit for controlling the driver circuit to produce substantially continuous power flow through the load when the inverter is energized and the A.C. power source is disconnected from the load;

a switch circuit connected between the A.C. power source and the load;

reference signal means for producing a sine wave reference signal of predetermined voltage and wave shape having a frequency slightly different from the frequency of the A.C. power source, said reference signal means connected to control the frequency of the output of the inverter;

reference phasing control means connected to the A.C. power source and the reference signal means for controlling the reference signal frequency to maintain the reference signal in phase with the A.C. power source when the A.C. power source is connected to the load;

phase synchronizing means operable when the inverter is energized by the D.C. source for connecting the load to the A.C. power source and for deenergizing the inverter circuit when the A.C. power source output voltage is above a predetermined level and the A.C. power source and the power means are momentarily in phase, a voltage comparison circuit connected to receive the reference signal and a measure of the A.C. power source output for producing an output equal to the instantaneous difference of the voltage of the reference signal and the voltage of the measure of the A.C. power source output;

a pulse circuit for producing output pulses of one polarity when the instantaneous voltage comparison circuit output is greater than a predetermined level, and for producing output pulses of an opposite polarity when the instantaneous voltage comparison circuit output is less than said predetermined level;

a voltage sensing control circuit connected to receive the pulse circuit output pulses for controlling the switch circuit to connect the A.C. power source to the load and to deenergize the inverter circuit when said output pulses are of said one polarity, and for controlling the switch circuit to instantaneously disconnect the A.C. power source from the load and instantaneously energize the inverter circuit when said output pulses are of said opposite polarity, voltage level sensing means connected to the A.C. power source and responsive to a minimum voltage of the A.C. power source output for effecting disconnection of the A.C. power source from the load and for concurrently effecting energization of the inverter circuit.

10. A system according to claim 9 wherein said D.C. power source is a battery and wherein said device also comprises means for disconnecting the battery to deactivate the system when the voltage of the battery drops below a predetermined minimum level.

11. A system according to claim 10 also comprising timing means for disconnecting the battery from the inverter to deactivate the system after a predetermined interval of continuous energization of the inverter by the battery.

References Cited by the Examiner

UNITED STATES PATENTS

| | | | |
|---|---|---|---|
| 1,951,482 | 3/1934 | Holden | 307—64 |
| 3,229,111 | 1/1966 | Schumacher | 307—64 |

ORIS L. RADER, *Primary Examiner.*

T. J. MADDEN, *Assistant Examiner.*